United States Patent Office 2,719,197
Patented Sept. 27, 1955

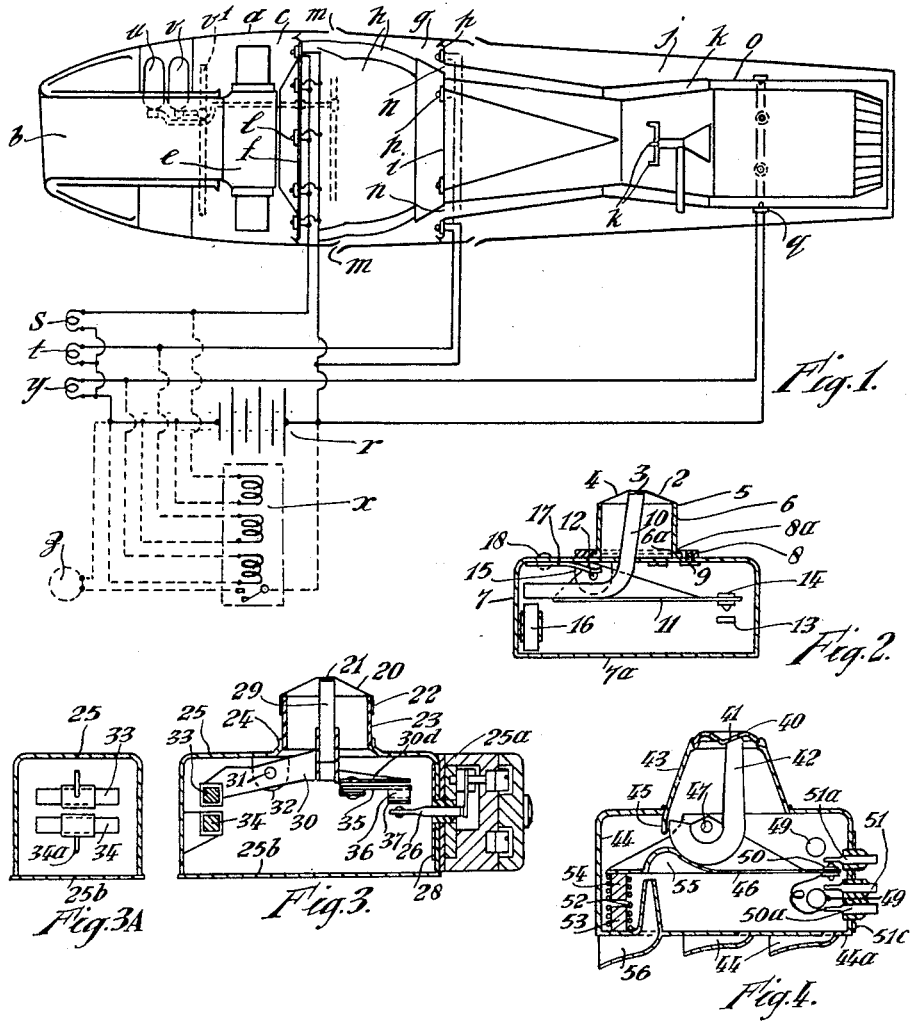

2,719,197

TEMPERATURE CHANGE RESPONSIVE DEVICES FOR USE IN POWER PLANT UNITS AND FOR OTHER PURPOSES

Henry W. Hall, Surrey, Robert N. C. Strain, Farnborough, and Anders Mathisen, London, England, assignors of one-half to Graviner Manufacturing Company Limited, London, and one-half to The Wilkinson Sword Company Limited, London, England, both British companies Application April 14, 1950, Serial No. 155,972

4 Claims. (Cl. 200—88)

This invention relates to improvements in temperature change responsive devices for use in power plant units and for other purposes.

It may be explained that power plant units of the general character which may be termed jet or gas turbine power plant units have abnormal temperature problems associated therewith owing to the high rate of fuel combustion.

Gas turbine power units capable for example of propelling an aircraft at speeds approaching or exceeding that of sound consume a large quantity of fuel in a comparatively small power unit, and the combustion chambers and other parts of the power unit are subject to very high temperatures and may be subject to deterioration due to prolonged use owing to the abnormal heat conditions, and a power unit which has been flown safely for a time may become subject to dangerous temperature conditions unexpectedly, with the result that a combustion chamber or other part becomes overheated until fracture occurs causing combustion gases to be discharged in the power unit housing resulting in rapid disintegration and complete destruction of the aircraft.

Gas turbine or jet power units are usually mounted in housings divided into compartments or fire risk zones. The front compartment usually denoted zone one contains the fuel injection appliances and other accessories behind which a fire resisting wall is provided in case fracture of fuel pipes and other accessories should occur, in which case the appliances and accessories may at once become enveloped in fire.

The second compartment, fire risk zone two, is behind the said fire resisting wall and contains the combustion chambers and their enclosing shrouds. If these fracture or burn through the power unit will disintegrate in a very short time.

Finally, the third compartment, fire risk zone three, is behind the combustion chamber compartment and usually separated therefrom by a second fire resisting wall. Zone three contains the jet pipe through which the combustion gases from the combustion chambers are discharged into the atmosphere. Overheating of this may indicate malfunctioning of parts of the power unit or in the case of exhaust reheat systems injection of excess fuel, and burning through will destroy the power unit housing with dangerous results.

In the case of aircraft gas turbine power units, normal temperatures in fire zone one are generally fairly low or as obtaining in piston engine power units, of the order of 100° F. to 150° F. If a fire occurs fire warning devices must give rapid warning enabling the pilot to shut off the fuel supply.

In fire zone two, temperatures of the combustion chambers are exceedingly high but an air stream passes between these and their enclosing shrouds. In case of fracture an instantaneous warning of change in temperature in the zone must be given and conditions are therefore very critical.

In zone three the jet pipe is also enclosed in a shroud guiding cooling air thereover. If however fuel is injected into this pipe very high temperatures are reached and temperature change detectors are therefore provided in the shrouds, projecting into the cooling air space. The normal temperature in the cooling air space adjacent the jet pipe may be quite high or of the order of 400° C., an increase of 100° C. indicating an extremely dangerous condition.

When detectors give warning of a temperature exceeding a predetermined safe value, the pilot closes the fuel supply control valve, and if the temperature falls below the safe value the detectors must indicate this and, therefore, resetting types of temperature change or fire warning devices become essential.

Several types of resetting fire warning devices are known but none meet the exacting requirements in fire zone two or three of jet or gas turbine power units.

Bimetallic strip and differential expansion of metal types are not satisfactory as they will normally be operating extremely near the dangerous condition position so that vibrational effects, slight variations in material characteristic, when exposed to high temperatures for prolonged periods, render them unreliable and capable of giving false warnings or failing to give warning when dangerous conditions arise.

Thermocouple types of devices depend for their operation upon a substantial temperature difference between the elements of the couple, which conditions may not exist in zone two or three, and such devices will not reliably indicate minor increments in temperature differences.

Similar remarks apply to temperature detecting devices depending on the variation of conductivity with temperature change of certain substances, these substances being liable to change their characteristics when exposed to high temperatures for prolonged periods.

It is possible to utilise magnetic materials which change their permeability very rapidly at a definite critical temperature and various devices utilising the above described phenomenon have been proposed for detecting a specified temperature of water or other liquids, for detecting abnormal temperature rise in electrical apparatus and detecting fire or flame such as in burners and in furnaces and the like. None of these known devices, however, are suitable for meeting the requirements of fire warning devices under all the conditions in a power unit of the kind described above.

It is one object of the present invention to provide temperature change responsive devices which will indicate any definite predetermined temperature with certainty under any predetermined conditions.

Another object of the invention is to provide arrangements of fire warning devices for use in aircraft and power units and the like which will indicate definite predetermined temperature conditions in any desired part of the power unit or in the aircraft or the like.

According to the present invention, a temperature change responsive device for use in an aircraft power plant unit comprises an element of magnetic material having a predetermined Curie point, an associated magnetic member, means preferably magnetic for producing relative movement between said element and member when the Curie point temperature is approached and temperature responsive or indicating means capable of actuation by said movement.

The magnetic material element may be moveable with respect to the magnetic member, generally a permanent magnet but an electro-magnet may be used, the movement of said element being employed to actuate temperature change indicating means.

For use in an aircraft power unit a temperature change responsive device according to the invention comprises an element of magnetic material having a predetermined Curie point and an associated permanent magnet which is moveable with respect to the element, such movement being utilised to actuate temperature change responsive or indicating means.

An aircraft comprising various compartments having different temperature condition responsive devices as described above may be utilised to indicate or respond to predetermined temperature condition in each compartment said devices having magnetic material elements with Curie points corresponding to the predetermined conditions in each compartment.

In a power plant unit comprising different compartments or dangerous temperature zones devices as described above are utilized in each danger zone, the devices therein being provided with devices having magnetic material elements with Curie points corresponding to the dangerous temperature conditions likely to arise in any individual zone so that a danger or fire warning indication may be obtained from each zone.

More specifically and for use in power plant units and for other purposes, the invention consists in a temperature change responsive device comprising an element of magnetic material of small mass and low heat capacity and having a predetermined Curie point, means for supporting said element and for projecting this into a variable temperature zone, said means also supporting a magnetic member, said element and member being relatively moveable to give an indication of temperature change in said zone.

As previously described, the magnetic material element may be moveable with respect to the magnetic member but preferably the magnetic member in the form of a miniature permanent magnet is moveable with respect to said element, such movement being utilised to operate electric switch means to give an indication of temperature change or perform any other action.

In accordance with further features of the invention a temperature change detecting device having a fixed magnetic material element of predetermined Curie point and an associated permanent magnet moveable with respect to said element is provided with a secondary permanent magnet arranged to repel the moveable magnet to produce its movement when the Curie point temperature of the element is approached.

Further, said moveable magnet may be moveably mounted by a supporting frame structure provided with electrical switch means, said magnet and its supporting frame being substantially balanced to reduce vibrational effects.

Further minor features of the invention will appear from the following description with reference to the accompanying drawings which show embodiments of the invention by way of example and in which:

Figure 1 shows an aircraft gas turbine power unit having three different temperature change zones in which is also shown detectors designed to correspond to the different temperature conditions, together with their associated electric circuits, Figure 2 shows one form of temperature change detector in section, Figures 3 and 3a show a similar form of detector also in section, Figure 4 shows a further form of detector device in section.

Referring to Figure 1, $a$ denotes the power unit nacelle or housing and $b$ the air intake duct leading to zone one denoted $c$ which contains the turbine blade impellor shaft bearing casing denoted $e$ and associated accessories, including the fuel injection appliances and the like, these being mounted upon casing $e$. The compartment termed zone one and denoted $c$ terminates in fire resisting wall $f$ separating this zone from zone two denoted $g$, which contains the combustion chamber shrouds denoted $h$, this compartment terminating in the second fire wall $i$ which separates zone two from zone three, denoted $j$, which contains the jet pipe $k$.

Compartment $c$ receives vast volumes of cold air through intake $b$ and the temperature of any parts therein does not normally rise above 100° C. to 150° C., and fire risk is mainly due to fracture of fuel piping or other accessories which may cause fuel under high pressure to be sprayed in this compartment which fuel may be ignited and commence to burn.

A plurality of temperature change or fire detectors denoted 1 of the character shown in Figure 2 are therefore mounted upon fire wall $f$, the metal discs of the detectors having in this case a Curie point of the order of 250° C. and being made of Ferro nickel alloy having a nickel content of 34%.

Owing to the fact that the temperature in compartment $c$ may be quite low when the cold air is far below freezing point it is essential that the Curie point metal alloy elements or discs are of absolute minimum mass and heat capacity in order that a fire warning may be given with as little delay as possible, and usually only one or two seconds is permissible in order that the pilot may have time to cut the fuel supply off before damage is done due to the fire.

Zone two or compartment $g$ containing the combustion chamber shrouds $h$ is much hotter but cooling air is forced into this compartment by air scoops denoted $m$, which air after being heated passes through apertures $n$ in fire wall $i$ into a space surrounding jet pipe $k$ formed by shroud $o$.

The ambient temperature round shrouds $h$ may be fairly high and temperature change or fire detectors denoted $p$ are mounted upon fire wall $i$ at positions where the normal temperature may be of the order of say 300° C.

The temperature of the combustion chambers is usually so high that any inadvertent increase may cause fracture. They are also subject to deterioration during prolonged use and any exceptional conditions may cause over-heating and fracture of the chambers and their surrounding shrouds, when combustion gases will strike the structural parts of the power unit and the aircraft, with almost instantaneously disastrous results.

It is therefore imperative that the temperature change responsive devices shall be unconditionally reliable, and that under no circumstances must the devices $p$ fail to operate if the ambient temperature in compartment $g$ exceeds the predetermined safe value, assumed in this case to be of the order of 400° C. as this indicates a dangerous condition arising in chamber shrouds $h$ which necessitates immediate throttling down until a safe temperature condition is restored.

False temperature change warnings are also unacceptable. Such might arise if devices $p$ operated below the normal temperature of about 300° C. and the metal discs upon devices $p$ are therefore of a ferro-nickel alloy having a nickel content of 39%. This alloy has a Curie point of 350° C. and is suitable for high magnetic induction density or has high permeability so that the attraction of the magnet thereto is powerful until the Curie point is approached. Temperature change detectors $p$ are therefore of exceptional reliability, as is essential for use in zone two of gas turbine or jet power units.

In zone three temperature responsive devices $q$ are mounted in shroud $o$ with the Curie point metal discs and the supporting tabular elements projecting into the space between jet pipe $k$ and shroud $o$. In this case metal discs of a ferro-nickel alloy of 45% nickel may be suitable as this alloy has a Curie point of 450° C. and similar properties to the discs of detectors $p$. Operation of detectors $q$ indicates overheating of the jet pipe and necessitates throttling down and fuel shut off to fuel nozzle $K$ as overheating may be caused by excess fuel injecting which may eventually cause a burn through of the jet pipe and its shroud and damage to the power unit housing and the aircraft.

Owing to the high temperatures the electrical leads within the power unit must be of special heat resisting cable or they may be of heat resisting steel fitted with ceramic beads as in electric fires. The leads are however connected to the aircraft accumulator denoted r and the electrical system comprises individual warning lights denotes s for zone one, t for zone two and y for zone three, these being normally mounted upon the aircraft instrument board, easily visible to the pilot. If a common or master warning device z is required a relay or similar device x is provided this having an energising winding in the circuit from the detectors in each zone to the corresponding warning light. If any detector in any one or more of the zones operates the relay will operate to close its contact and operate device s which may be audible or visible or both.

On operation of device z, the pilot will observe which of lights s, t or y has operated, and in which zone a change in temperature condition exists, and appropriate action can then be taken.

The power unit is provided with fire extinguishing fluid containers u and v, container u being connected to spray piping u' in zone two, and preferably another ring, not shown, is provided in zone three. Container v is connected to spray ring v' in zone one. These containers are connected to crash or impact actuated devices and discharge automatically in a crash of the aircraft to inundate the power unit with fire extinguisher fluid, they may also be operated automatically by the fire detectors but generally they are arranged for manual operation by the pilot by push button control in case a fire occurs in flight in zone one, and in case the temperature does not drop sufficiently rapidly in zones two and three after throttling down due to a temperature change warning.

Referring now to Figure 2, numeral 2 denotes a Curie point material disc in cap or hood form, the central portion 3 of which may be of the order of 1/16" down to 1/32" thick the sides or skirt being turned down to .015" to .010" thick and formed to a rim 5 which is secured to a heat resisting steel tubular member 6 by welding or other reliable securing process or means. In order to increase heat absorption by disc 2 this may be wholly or partly blackened or have a silica coating applied thereto as this expedient tends to facilitate absorption of heat.

Member 6 is secured to a mechanism housing or casing 7 also of theat resisting steel and is detachably secured thereto by a rim 6ª formed on member 6 and clamped to casing 7 by a ring 8 secured to housing 7 by studs 9, rim 6ª being engaged by a rim 8ª formed on ring 8. By this means cap 2 and member 6 may be changed if desired upon casing 7 in order that suitable Curie point material elements may be provided upon any detecting device, after manufacture and assembly, if necessary.

The permanent magnet denoted 10 is of nickel-aluminium or nickel-aluminium-iron-cobalt or similar suitable alloy, either cast or formed by sintering of compressed alloy metal powder in known manner. Such magnets have high magnetic energy, high coercive force and high magnetic stability against the effects of heat, vibration and demagnetisation by associated magnetic flux fields. Magnet 10 can safely be exposed to temperatures approaching 600° C. but the positioning of the devices should be such that temperatures of the order of 400° C. to 500° C. are not normally exceeded.

Magnet 10 is L-shaped and is mounted by a frame structure 11 which clamps the horizontal leg of magnet 10, 11 being provided with a spindle 12 firmly securing frame 11 and magnet 10 together and upon which the magnet and frame can tilt to a limited extent. Frame 11 is provided with an electrical contact 14 insulated therefrom by ceramic or like insulation, this being arranged to close with contact point 13 also mounted upon ceramic or like insulation secured to housing 7. Spindle 12 is freely and rotatably supported by a pair of lugs or bracket members 15 secured to housing 7 and a secondary permanent magnet 16 of the same kind of material as magnet 10 is secured in housing 7 and is arranged to repel the pole end of the horizontal leg of magnet 10 to rotate frame 11 and spindle 12 against the attraction between the pole end of magnet and disc portion 3, the adjacent pole ends being of same polarity.

By this means a spring is not necessary to tilt magnet 10 and actuate contacts 13 and 14 when disc 2 is heated above the Curie point temperature, an important feature as springs capable of withstanding high temperatures are not easily obtainable of adequate reliability.

Magnet 10 and frame 11 are substantially balanced upon spindle 12 to resist vibrational effects; however when disc portion 3 approaches the Curie point temperature the system may chatter owing to play of spindle 12 in its supporting bearings. This is eliminated by a heat resisting steel leaf spring 17 secured to housing 7 by rivet 18, the free end of spring 17 resting on spindle 12 and applying a slight pressure thereto, to hold the spindle on one side of its bearings and apply slight friction thereto. This eliminates any tendency of the contacts to chatter, which might result in a flicker of the warning lamps when the dangerous temperature is approached which might be misleading and is not permissible.

Heat resisting flexible leads suitably insulated connect contacts 13 and 14 to a ceramic or like material insulation terminal block not shown but secured externally upon housing 7, from which block leads are connected to the warning lights and other detectors of which a plurality may be in parallel. Housing 7 may be open to facilitate ventilation or closed by a bottom plate 7ª hermetically secured thereto, for example by welding.

The temperature change and fire detecting device is therefor of extreme simplicity and reliability. Magnet 10 may be round, rectangular or square of section and of 1/8" by 1/8" section or equivalent. The attraction to disc portion 3 is quite powerful for the purpose intended and when the Curie point temperature is approached the magnet tilts away under action of magnet 16 closing contacts 13 and 14 with a firm snap action. Similarly when disc 2 again is cooled below the Curie point temperature, magnet 10 is tilted sharply into contact with portion 3, so that no snap action devices are necessary. Adequate electric current can flow through contact points 13 and 14 to light the warning lamps direct so that no relays or any current amplifying devices are necessary as is the case with certain other types of detecting devices.

Referring now to Figure 3 and Figure 3A, 20 denotes the Curie point magnetic material disc thickened at 21 to provide an adequate magnetic flux path. A flange 32 is welded or brazed to non-magnetic heat resisting material tube 23 which itself is welded at 24 to similar material housing 25. The housing is provided with a known form of ceramic or other heat resisting insulation material terminal block 25ª and a pair of contact members 26 mounted by bonding to insulation beads 27 which beads are also bonded to metal disc 28 welded to housing 25 to form a hermetical seal. Housing 25 is provided with a welded on base plate 25ᵇ which finally hermetically seals the housing and parts 20 and 23.

A permanent magnet 29 is secured firmly in a frame structure 30 which is supported by spindle 31 rotatable in bearing lugs 32 secured to housing 25. Frame 30 carries a secondary permanent magnet 33 also secured firmly therein which is suspended above another permanent magnet 34 secured firmly by bracket means 34ª to housing 25. Bracket 30 is provided with an extension 30ª which supports a spring 35 which carries an insulation block 36 on which a conducting member 37 is secured, this being adapted to bridge the contact points upon members 26 when disc 20 is heated above the Curie point temperature when magnet 34 will repel magnet 33, these magnets having like poles adjacent.

Repulsion of magnets 33 and 34 tilts frame 30 on spindle 31 to close the contacts and give a fire or temperature change warning over leads connected to terminal block 25a. Frame 30 is so constructed, and magnets 29 and 33 are so dimensioned that the frame is practically balanced on spindle 31 and vibration of spring 35 is damped by proximity of insulator 36 with the projecting end of projection 30a so that any tendency to vibrate at its natural frequency is counteracted.

The whole device is so designed and constructed that when vibrated on a variable frequency vibration machine there is no tendency to chatter between plate 37 and the contact points on member 26 so that either full on or full off conditions are obtained under conditions of vibration.

Referring now to Figure 4, numeral 40 denotes the Curie point material disc of hood shape but provided with a depression 41 shaped to permit full face contact with the pole end of permanent magnet 42. Disc 40 is secured to conical support member 43 by welding or spinning over, member 43 being welded to housing 44.

Member 43 is of magnetic material and is provided with a projection 45. Magnet 42 is of U or horseshoe shape but has one leg removed, the curved portion being secured in a frame structure 46 which is mounted by spindle 47 so as to permit limited tilting. The short leg of magnet 42 terminates adjacent projection 45 so as to form a magnetic circuit through member 43, disc 40 and magnet 42.

Housing 44 is provided with a base 44a welded or otherwise secured thereto and is provided with air scoops 48 which is arranged to direct cooling air through housing 44, this air escaping through holes 49 in the housing wall.

Frame structure 46 is provided with an insulated contact point 50 secured upon a slightly flexible extension of the frame. Contact 50 is connected by a flexible lead to an insulated contact pin 50a mounted in similar manner to contact 26 upon a disc 51c secured to housing 44 and also carrying insulated contact pin 51a on which contact 50 is normally resting and contact 51 with which contact 50 makes contact when the device operates. By this arrangement a light indicating normal conditions can be provided, this being extinguished and a warning light comes on when a dangerous or specified temperature condition arises.

Frame 46 is acted upon by spring 52 mounted upon guide pin 53 secured to base 44a and pin 54 secured to frame 46. A spoon shaped recess 55 is formed in frame 46 and an air scoop and nozzle device 56 is secured in base 44a, which device will apply an air jet to recess 55 when the air scoops face the cooling air stream. If therefore spring 52 should fail the air jet will apply a tilting force to frame 46 so that when disc 40 is heated to its Curie point, magnet 42 will tilt and permit closure of contacts 50 and 51 to give a fire or temperature change warning.

The devices shown in Figures 2 to 4 are substantially to scale and show full size and are therefore extremely compact and light in weight, as is desirable for use on aircraft.

Magnetic materials having Curie points at temperatures from below zero to over 1000° C. are known and, provided the permanent magnets are adequately shielded from excess temperatures or are cooled sufficiently, the devices may be utilised for detecting any desired temperature change.

The miniature temperature change detecting devices may therefore be utilised for a multiplicity of purposes, including use in central heating insulations in buildings when the control obtained may be similar to that described in connection with temperature control in aircraft passenger and crew compartments.

What we claim and desire to secure by Letters Patent is:

1. A magnetic temperature detecting device for detecting and translating into mechanical movement the presence of a predetermined temperature, comprising a fixed magnetic element having a predetermined Curie point corresponding to said predetermined temperature, a magnet having two ends of opposite polarity, a pivotally mounted supporting structure for said magnet on which said magnet is supported with one end of given polarity normally positioned in close proximity to said magnetic element normally to be attracted to said magnetic element with a predetermined force of magnetic attraction, and magnetic force-applying means operatively positioned adjacent to the other end of said magnet and forcing said other end away therefrom to urge said one end away from said magnetic element with a force the magnitude of which is less than said predetermined force of attraction, whereby said one end is retracted from said magnetic element when said predetermined force of attraction has disappeared upon the temperature of said element reaching its Curie point and means for substantially balancing said magnet and said supporting structure to reduce vibration effects.

2. A magnetic temperature detecting device for detecting and translating substantially instantaneously into mechanical movement the presence of a predetermined dangerous temperature, comprising a fixed magnetic element of small mass and low heat capacity having a predetermined Curie point corresponding to said dangerous temperature, a first magnet having two ends of opposite polarity pivotally balanced at an intermediate point between said ends with one end of given polarity normally positioned in close proximity to said magnetic element normally to be attracted to said magnetic element with a predetermined force of magnetic atraction, and a second magnet with one pole end positioned adjacent to and being of the same polarity as the other end of said first magnet and repelling said other end to urge said one end away from said magnet element with a force the magnitude of which is less than said predetermined force of attraction.

3. A magnetic temperature detecting device for use in a jet power plant for detecting and translating into mechanical movement substantially instantaneously the sudden presence of a predetermined dangerous temperature in a zone of said power plant comprising a fixed dish-shaped magnetic element of small mass and low heat capacity having a predetermined Curie point corresponding to said dangerous temperature, a first magnet having two ends of opposite polarity pivotally mounted at an intermediate point between said ends with one end of given polarity normally positioned in close proximity to a surface of said dish-shaped magnetic element normally to be attracted to said element with a predetermined force of magnetic attraction, and a second magnet with one pole end positioned adjacent to and being of the same polarity as the other end of said first magnet and repelling said other end to urge said one end away from said dish-shaped magnetic element with a force the magnitude of which is less than said predetermined force of attraction.

4. A magnetic temperature detecting device for detecting and translating substantially instantaneously into mechanical movement the presence of a predetermined dangerous temperature, comprising a heat-resisting housing, an open-ended tubular member of heat resisting material extending from said housing, a magnetic element of small mass and low heat capacity having a predetermined Curie point corresponding to said dangerous temperature, said magnetic element being fixed to the tubular member and closing the open end thereof, a first magnet having two ends of opposite polarity pivotally mounted within said housing with one end of given polarity normally positioned in close proximity to said magnetic element normally to be attracted to said magnetic element with a predetermined force of magnetic attraction, and a second magnet also mounted within said housing with one pole end positioned adjacent to and being of the same polarity as the other end of said first magnet and repelling said other end to urge said one end away from said magnetic element with a force the magnitude of which is less than said predetermined force of attraction.

(References on following page)

References Cited in the file of this patent

UNITED STATES PATENTS

| | | |
|---|---|---|
| 570,212 | Wurts | Oct. 27, 1896 |
| 822,323 | Thomson | June 5, 1906 |
| 1,244,332 | Hughs | Oct. 23, 1917 |
| 1,499,112 | Lippincott | June 24, 1924 |
| 1,655,847 | Siebs | Jan. 10, 1928 |
| 1,655,852 | Adams | Jan. 10, 1928 |
| 2,100,183 | Cowan | Nov. 23, 1937 |
| 2,214,928 | Klapperich | Sept. 17, 1940 |
| 2,296,969 | Wittmann | Sept. 29, 1942 |
| 2,339,087 | Mantz | Jan. 11, 1944 |
| 2,431,352 | Theillaumus | Nov. 25, 1947 |
| 2,431,443 | Callahan | Nov. 25, 1947 |
| 2,540,527 | Ingels | Feb. 6, 1951 |

FOREIGN PATENTS

| | | |
|---|---|---|
| 111,921 | Australia | Nov. 8, 1940 |